(12) United States Patent
Luecke

(10) Patent No.: US 8,573,685 B2
(45) Date of Patent: Nov. 5, 2013

(54) SLIDING ROOF SYSTEM

(75) Inventor: Georg Luecke, Dietzenbach (DE)

(73) Assignee: Roof Systems Germany GmbH (DE)

( * ) Notice: Subject to any disclaimer, the term of this patent is extended or adjusted under 35 U.S.C. 154(b) by 0 days.

(21) Appl. No.: 13/489,978

(22) Filed: Jun. 6, 2012

(65) Prior Publication Data

US 2012/0313401 A1    Dec. 13, 2012

(30) Foreign Application Priority Data

Jun. 7, 2011   (DE) .......................... 10 2011 103 527

(51) Int. Cl.
*B60J 7/22*    (2006.01)

(52) U.S. Cl.
USPC ......................................................... 296/217

(58) Field of Classification Search
USPC ......................................................... 296/217
See application file for complete search history.

(56) References Cited

U.S. PATENT DOCUMENTS

| | | | |
|---|---|---|---|
| 4,966,409 A * | 10/1990 | Schmidhuber et al. ....... | 296/213 |
| 6,457,769 B2 * | 10/2002 | Hertel et al. .................... | 296/217 |
| 7,234,767 B2 * | 6/2007 | Boss et al. ...................... | 296/217 |
| 7,533,929 B2 * | 5/2009 | van Boxtel ..................... | 296/217 |

FOREIGN PATENT DOCUMENTS

| | | |
|---|---|---|
| DE | 10 2005 059 274 A1 | 6/2007 |
| EP | 1 112 875 B1 | 9/2000 |
| EP | 1 920 960 A1 | 11/2006 |

OTHER PUBLICATIONS

Search Report dated Mar. 3, 2012 for DE Application No. 10 2011 103 527.7.

* cited by examiner

*Primary Examiner* — Dennis Pedder
(74) *Attorney, Agent, or Firm* — Cantor Colburn LLP

(57) ABSTRACT

A sliding roof system is described including a guide rail, an adjustable cover, a bearing block mounted to the guide rail, a side panel one end of which is mounted to the bearing block by means of a slotted guide, and a spring which urges the end of the side panel facing away from the bearing block against the cover. Further described is a method of controlling the lifting movement of a side panel of a sliding roof system, in which when the cover of the sliding roof system is adjusted to a ventilating position, the rear end of the side panel follows the opening movement of the cover while the front end performs a lift that is smaller than the lift of the cover, the side panel being shifted forward relative to the cover at the same time.

15 Claims, 1 Drawing Sheet

SLIDING ROOF SYSTEM

CROSS REFERENCE TO RELATED APPLICATIONS

This application claims priority under 35 U.S.C. §119 to German Patent Application No. DE 10 2011 103 527.7 filed Jun. 7, 2011, the contents of which are incorporated herein by reference thereto.

BACKGROUND

The invention relates to a sliding roof system for a motor vehicle, in which provision is made for a side panel.

The side panel is associated with a cover of the sliding roof system, the cover being adapted to be adjusted from a closed position to a ventilating position and possibly also to other positions. In the ventilating position the cover is tilted outwards at its rear edge as viewed in the direction of travel, so that fresh air can enter the vehicle interior. To avoid a risk of trapping in the area of the lateral edges of the cover, it is known to arrange the side panel there, which is lifted along with the cover when the latter is adjusted to the ventilating position. A system of this type is known from EP 1 632 376 A2, the contents of which are incorporated herein by reference thereto.

Accordingly, it is desirable to provide an improved sliding roof system.

SUMMARY OF THE INVENTION

The object of the invention consists in providing a sliding roof system in which the side panel can be mounted and its movement can be controlled with a smaller amount of effort and, in addition, an improved functionality is obtained in particular in the region of the front end of the side panel.

To achieve this object, according to the invention provision is made for a sliding roof system including a guide rail, an adjustable cover, a bearing block mounted to the guide rail, a side panel one end of which is mounted to the bearing block by means of a slotted guide, and a spring which urges the end of the side panel facing away from the bearing block against the cover. The system according to the invention is based on the fundamental idea of allowing a lifting movement also at the front end of the side panel, namely by means of the slotted guide. This lifting movement allows a particularly compact structure in the vertical direction while the desired covering effect of the side panel is ensured at the same time. Furthermore, the sliding roof system according to the invention distinguishes itself by a particularly compact structure.

In one embodiment, provision is made that the slotted guide is formed by a pin which is mounted to the side panel and a slot provided in the bearing block. This allows the desired relative displacement between the bearing block and the side panel to be ensured with a minimum number of components.

The side panel may be a solid plastic component, which results in lower manufacturing costs.

In one embodiment, provision is made that the spring is a leaf spring. This also contributes to a compact structure since the leaf spring has almost no overall height in the tensioned position, that is, when the cover is in the closed position.

According to one embodiment, provision is made that the spring is embedded in the bearing member. This reduces the assembly expenditure. More particularly, the spring can be injection molded in the bearing element during production of the latter.

The slotted guide is in one embodiment arranged at the front end of the side panel as viewed in the direction of travel. This ensures that the desired lifting movement is initiated directly at the front end of the side panel.

According to one exemplary embodiment, provision is made that, as viewed in the direction of travel from the front to the rear, the slot first descends, then turns to the rear over a curved, in particular arcuate portion, and subsequently extends further to the rear in a straight line. Such a contour of the slot allows the desired sequence of motion in the adjusting of the cover to the ventilating position to be ensured with little effort.

According to one embodiment of the invention, provision is made that the spring together with the slotted guide controls the side panel in such a way that the lifting movement of the cover in the region of the front end of the side panel is greater than the lifting movement of the side panel in this region. This also ensures a compact design in the vertical direction.

To achieve the above-mentioned object, according to one embodiment of the present invention provision is further made for a method of controlling the lifting movement of a side panel of a sliding roof system, in which when the cover of the sliding roof system is adjusted to a ventilating position, the rear end of the side panel follows the opening movement of the cover while the front end performs a lift that is smaller than the lift of the cover, the side panel being shifted forward relative to the cover at the same time. With respect to the advantages that are attained, reference is made to the above discussions.

In one embodiment, a sliding roof system is provided, the system having: a guide rail; an adjustable cover; a bearing block mounted to the guide rail; a side panel one end of which is mounted to the bearing block by a slotted guide; and a spring that urges an end of the side panel facing away from the bearing block against the cover.

In another embodiment, a method of controlling the lifting movement of a side panel of a sliding roof system is provided, the method including the step of: adjusting a cover of the sliding roof system to a ventilating position, such that a rear end of the side panel follows an opening movement of the cover while a front end of the side panel performs a lift that is smaller than a lift of the cover, and wherein the side panel is shifted forward relative to the cover at the same time.

BRIEF DESCRIPTION OF THE DRAWINGS

The invention will be described below with reference to an embodiment which is illustrated in the accompanying drawings, in which.

DETAILED DESCRIPTION

Figure 1:
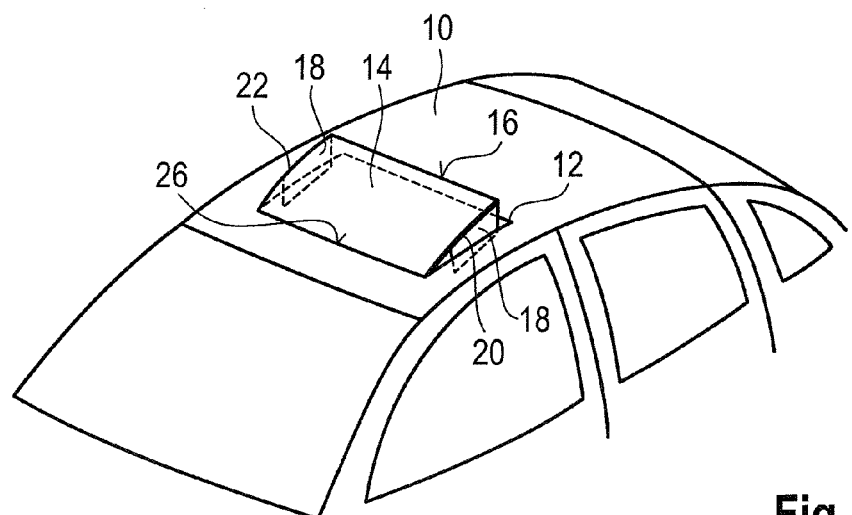
FIG. 1 schematically shows a vehicle roof with a sliding roof system according to the invention.

FIG. 1 shows a vehicle roof 10 which is provided with a sliding roof system. Provided in the vehicle roof 10 is a roof opening 12 having a cover 14 associated therewith. Starting from a closed position, in which the roof opening 12 is closed, the cover can be adjusted to a partly or fully opened position. In order to completely expose the roof opening, the cover 14 can, for example, be tilted upwards and shifted to the rear over the vehicle roof, approximately parallel to the outer skin of the vehicle roof. The cover 14 can also be adjusted to the ventilating position shown in FIG. 1, in which a rear edge of the cover 14 is lifted such that it is in a position above the vehicle roof 10. As a result, a gap is opened between the edge 16 and the roof.

Associated with the cover 14 is a side panel 18 which is arranged below the cover 14 and which, when the cover 14 is in the ventilating position, extends along lateral edges 20, 22 of the cover, roughly parallel to the direction of travel of the vehicle. The two side panels 18 are positioned below the cover here, covering the gap between the cover 14 and the vehicle roof 10.

The side panels 18 are formed by an elongated, generally rectangular body made of plastic, which includes a pin 30 at its front end. This pin engages in a guide slot 32 which is formed in a bearing block 34. The bearing block 34 is fixedly mounted to the vehicle, in particular to a guide rail 36 which is part of the sliding roof system and extends along the lateral edges of the roof opening 12 roughly parallel to the direction of travel of the vehicle.

As viewed from the front to the rear, the guide slot 32 first extends downward, more particularly substantially vertically downward, and then continues into a curved, more particularly arcuate, portion that extends over 90 degrees. This is adjoined by a straight section in which the guide slot extends further to the rear. The engagement of the pin 30 into the guide slot 32 constitutes a slotted guide by means of which the relative displacement between the side panel 18 and the bearing block 34 is controlled.

A spring 38 which is in the form of a leaf spring is arranged at the rear end of the bearing block 34 facing away from the guide slot 32. The front end of the leaf spring 38 is attached to the bearing block 34. With a view to a simple production, the leaf spring 38 may be embedded into the bearing block 34 during injection molding thereof. The rear end of the leaf spring 38 facing away from the bearing block 34 rests against a spring abutment 40 which is provided on the rear end of the side panel 18 facing away from the pin 30. The spring abutment 40 is in the form of a cylindrical, journal-like surface which is engaged by a seat 42 that is semicircular in cross-section and molded into the leaf spring 38. The leaf spring 38 is pretensioned such that it urges the spring abutment 40 of the side panel 18 upwards and thus against the cover 14.

Figure 2:
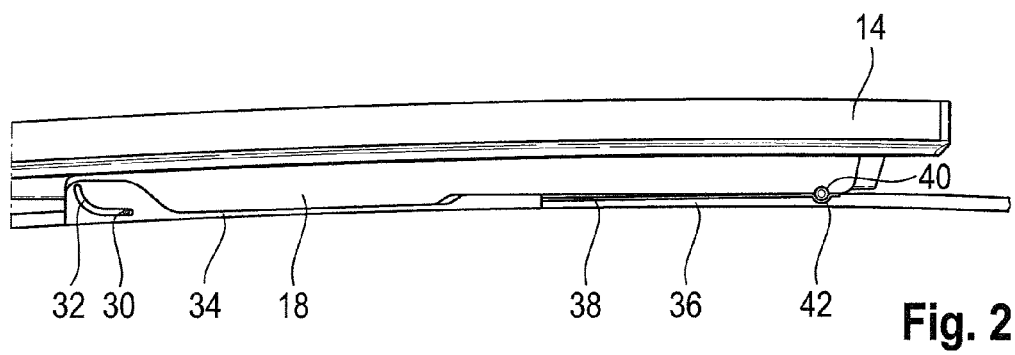
FIG. 2 shows part of the sliding roof system in a schematic side view, the cover being in a closed position.

When the cover 14 is in the closed condition (see FIG. 2), the side panel 18 engages the cover 14 substantially flush therewith. In cooperation with the spring abutment 40 the leaf spring 38 determines the position of the side panel 18 in the longitudinal direction of the vehicle. As can be seen in FIG. 2, the pin 30 is at the rear end of the guide slot 32.

Figure 3:
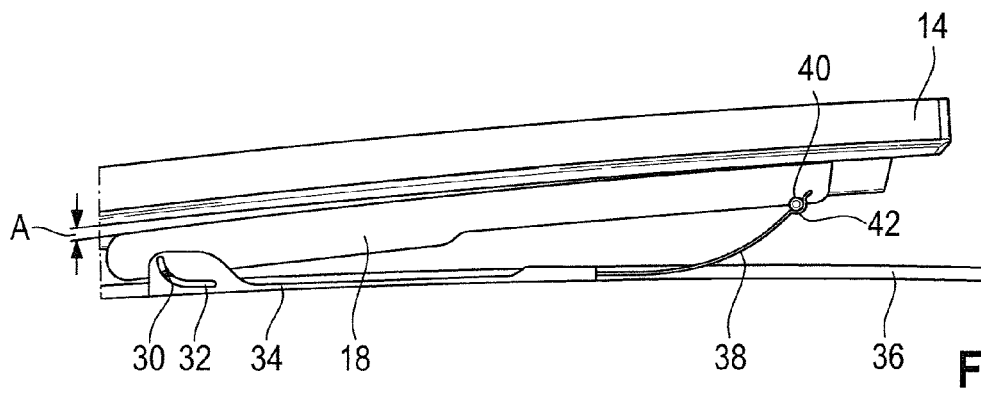
FIG. 3 shows a view corresponding to that of FIG. 2, the cover being in a ventilating position.

When the cover 14 is brought into the ventilating position, the rear end of the side panel 18 follows this lifting movement because the spring 38 presses the side panel 18 against the cover 14 by means of the spring abutment 40. Since the leaf spring 38 is bent upwards during the movement of the spring abutment 40 of the side panel 18, the seat 42 is shifted obliquely upward and forward, as a result of which the spring abutment 40 and thus the side panel 18 and the pin 30 in the guide slot 32 are urged forward. The pin 30 thereby moves to the upwardly curved section of the guide slot 32, so that the side panel 18 is likewise lifted at its front portion, that is, near the slotted guide. As can be seen in FIG. 3, this lifting movement is, however, smaller than the lifting movement of the cover 14 in this region. As a result, the cover 14 moves away from the side panel 18 by a distance A in the region of the front end of the side panel 18 when the cover 14 is in the ventilating position.

When the cover 14 is closed again, the sequence of motion is effected in the reverse direction, as a result of which the pin 30 is pulled to the rear end of the guide slot 32 again and the side panel 18 is lowered, with the cover 14 finally also (at least approximately) resting against the front end of the side panel again.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sliding roof system, comprising:
a guide rail;
an adjustable cover;
a bearing block mounted to the guide rail;
a side panel one end of which is mounted to the bearing block by a slotted guide; and
a spring that urges an end of the side panel facing away from the bearing block against the cover, wherein the spring is embedded in the bearing block.

2. The sliding roof system according to claim 1, wherein a pin is mounted to the side panel and the pin is configured to travel in the slotted guide.

3. The sliding roof system according to claim 1, wherein the side panel is a solid plastic component.

4. The sliding roof system according to claim 1, wherein the spring is a leaf spring.

5. The sliding roof system according to claim 1, wherein the slotted guide is arranged at a front end of the side panel as viewed in an orientation of the sliding roof system.

6. A sliding roof system, comprising:
a guide rail;
an adjustable cover;
a bearing block mounted to the guide rail;
a side panel one end of which is mounted to the bearing block by a slot in the bearing block; and
a spring that urges an end of the side panel facing away from the bearing block against the cover, wherein as viewed in an orientation of the sliding roof system from front to rear, the slot first descends, then turns to the rear over a curved arcuate portion, and subsequently extends further to the rear in a straight line.

7. The sliding roof system according to claim 2, wherein the side panel is a solid plastic component.

8. The sliding roof system according to claim 7, wherein the spring is a leaf spring.

9. The sliding roof system according to claim 6, wherein the spring is embedded in the bearing block.

10. The sliding roof system according to claim 9, wherein the slot is arranged at a front end of the side panel as viewed in an orientation of the sliding roof system.

11. A sliding roof system, comprising:
guide rail;
an adjustable cover;
a bearing block mounted to the guide rail;
a side panel one end of which is mounted to the bearing block by a pin that travels in a slot of the bearing block; and
a spring that urges an end of the side panel facing away from the bearing block against the cover, wherein the spring is embedded in the bearing block.

12. The sliding roof system according to claim 11, wherein the slot is arranged at a front end of the side panel as viewed in orientation of the sliding roof system.

13. The sliding roof system according to claim 12, wherein the side panel located below the adjustable cover.

14. The sliding roof system according to claim 11, wherein the side panel is a pair of side panels located below the cover on opposite sides thereof.

15. The sliding roof system according to claim 1, wherein the slotted guide, as viewed in an orientation of the sliding roof system, from front to rear, first descends, then turns to the rear over a curved arcuate portion, and subsequently extends further to the rear in a straight line.

\* \* \* \* \*